UNITED STATES PATENT OFFICE.

JOSEPH KETCHUM, OF BROOKLYN, NEW YORK.

LUBRICANT.

SPECIFICATION forming part of Letters Patent No. 467,938, dated February 2, 1892.

Application filed September 1, 1891. Serial No. 404,448. (No specimens.)

*To all whom it may concern:*

Be it known that I, JOSEPH KETCHUM, a citizen of the United States, residing at Brooklyn, in the county of Kings and State of New York, have discovered a new and useful Lubricant, of which the following is a specification.

I have discovered that certain metallic chromites, particularly cromite of iron, produced in the form of an impalpable powder and combined with a suspending or binding medium, such as glycerine, oil, or paraffine, constitutes a most valuable and efficient lubricator for bearings of all kinds. This discovery is the subject of my present application. The chromites that may be used to advantage for this purpose are those of harder character, such as those of the chromite of copper or manganese; but in practice I have found that the best and most desirable on many accounts is the chromite of iron. This substance does not exist, so far as I am aware, in a pure natural state, nor in a condition which is suitable for my purposes. I therefore produce it artificially by the following process: I combine in equivalent proportions bichromate of potash and the sulphate of the metallic base, preferably of iron, and thoroughly mixed in a finely-divided condition. I place these substances in a fire-clay crucible or other suitable receptacle and expose them to a temperature gradually increased until the powder reaches a white heat. By this means chromite of iron and sulphate of potash are formed, the latter of which is readily removed by washing, leaving the chromite in a chemically-pure state. As thus produced, the iron chromite is in the form of an impalpable powder. I mix any desired quantity of this powder with a suitable medium for holding it in suspension or binding it together sufficiently for its proper application as a lubricant. I use, for instance, glycerine, mixing with a given quantity of the powder more or less of the glycerine, according to the degree of fluidity that I wish to obtain. I may use other binding or suspending agents, according to the character of the lubricant which I wish to obtain or the nature of the work which it is designed to perform.

I have used this lubricant more especially for the ball-bearings and sprocket-chains of cycles; but its use is not limited in this respect, for, so far as my experience shows, its applicability is general.

What I claim is—

1. A lubricant composed of a metallic chromite in the condition of an impalpable powder and a binding or suspending medium for the same.

2. A lubricant composed of chromite of iron in the condition of an impalpable powder and glycerine.

JOSEPH KETCHUM.

Witnesses:
PARKER W. PAGE,
ERNEST HOPKINSON.